EDITING METHOD AND SYSTEM

Filed Feb. 15, 1963

NORMAN F. BOUNSALL
INVENTOR
BY Nathan N. Kallman
ATTORNEY

United States Patent Office 3,257,504
Patented June 21, 1966

3,257,504

EDITING METHOD AND SYSTEM

Norman F. Bounsall, Palo Alto, Calif., assignor to Ampex Corporation, Redwood City, Calif., a corporation of California Filed Feb. 15, 1963, Ser. No. 258,759
6 Claims. (Cl. 178—5.6)

Figure 1:
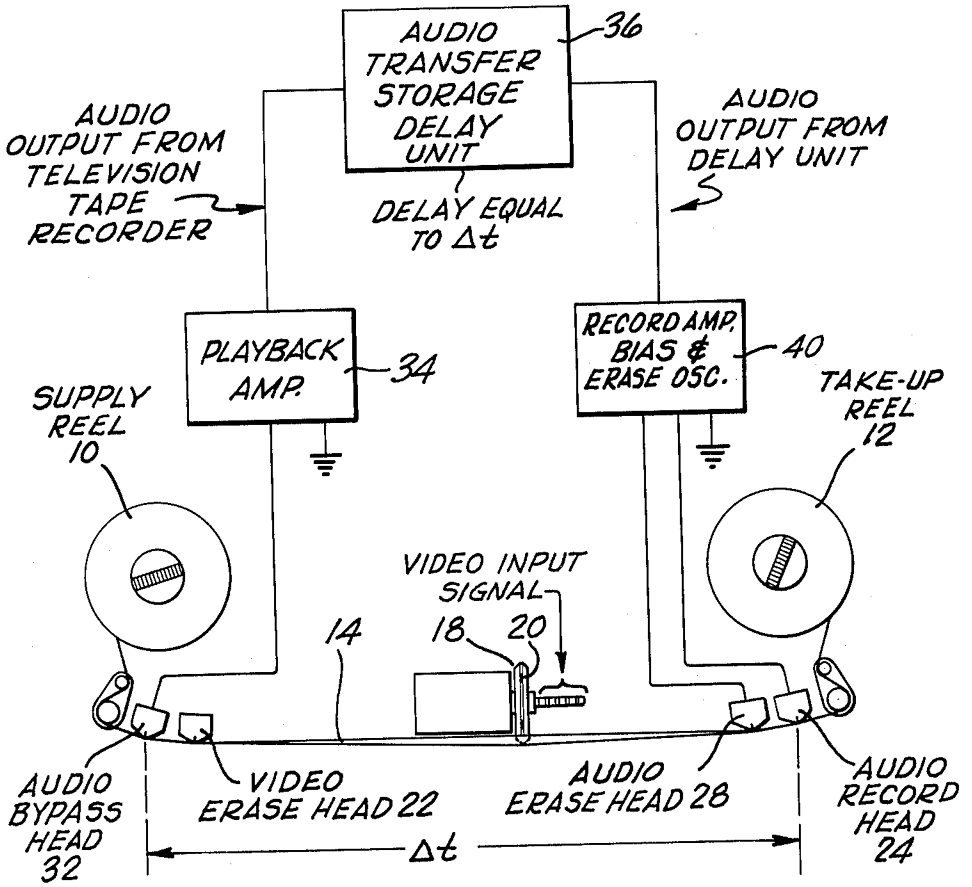

This invention relates to an editing method and system, and in particular to an improved editing method and system adapted for use with a recording apparatus that records separate signals on separate tracks of a storage medium.

One well known recording apparatus that is used for processing wideband signals, such as television or video signals, utilizes a transverse scanning pattern on a magnetic tape to register the video or picture information. While transverse tracks representing video information are recorded on a longitudinally moving tape, a longitudinal track carrying audio information is also recorded on the tape. In such a system, as set forth in U.S. Patents 2,866,012, 2,921,990 and 2,942,061, for example, the magnetic tape is held in an arcuate configuration, while a rotary head drum carrying magnetic transducer at its periphery traverses the width of the tape. By such means, television program material of long duration may be recorded for subsequent presentation by broadcast studios.

However, after the recording process, the necessity for a "remake" of a portion of a program may arise, requiring revision of the recorded program material by editing. One way to achieve editing is by mechanical splicing. With this approach, it is necessary to physically cut and remove the undesired segment of tape and to replace such segment with another recorded section of tape. But the process of mechanical splicing is tedious, time-consuming, and subject to human and mechanical error, among other things.

In U.S. Patents 3,176,067 and 3,084,215, both assigned to the same assignee, electronic editing systems that avoid the difficulties of mechanical splicing are described. In such systems, the editing is achieved by erasure of the magnetically recorded information by re-recording new material on the erased tape portion in precise synchronism with the old material by the use of electronic means. Thus, new information may be inserted or assembled together with a previously recorded tape without mechanical splicing or cutting of the tape itself. Such editing systems operate very well when both the audio track and video track are simultaneously replaced by new information.

However in many instances, a producer of a television show may desire to maintain the audio track and re-record a portion of the picture information. Such occasions arise, for example, when a dance group or acrobatic team has made a "fluff" during a video recording, but the accompanying background music and sound has been well presented. It is apparent that it would often be desirable to keep the sound and music record, but to eliminate a video portion having poor quality for one or more reasons.

With mechanical splicing, both the video and audio signals are lost, in addition to other disadvantages. On the other hand, in presently known recording systems that utilize the transverse scan approach and electronic editing, such as described in the above-identified patent applications, new recorded video tracks would deleteriously affect the audio signal track, if such audio track were retained. This degradation of the audio signal occurs because with tapes that are recorded by rotary head transverse scanning, the transverse tracks of video information, as they are laid down, cross the area in which the longitudinal audio track appears. However, during an initial recording where both the video and audio signals are being registered as new information, the parts of the video transverse tracks that penetrate the audio track area are erased by the audio erase head prior to the commencement of the actual audio recording. But, during an editing process, if it is desired to preserve a previously recorded audio track while replacing video information, the new video and old audio tracks would cross, resulting in intermodulation and a distorted audio signal output during the playback mode.

An object of this invention is to provide a novel and improved electronic editing system.

Another object of this invention is to provide an editing system wherein a recorded audio system may be retained while a new video signal is introduced to a segment of a recorded medium.

According to this invention, an electronic editing system for transverse scan magnetic tape apparatus comprises an audio signal bypass head and a storage delay unit. During the editing process, before erasure of a selected number of transverse tracks carrying an undesirable video signal, the audio signal track portion corresponding to such video signal is sensed by the bypass head and stored in the delay unit. Subsequently, new video information is recorded in the erased area of the magnetic tape, and then the audio track portion adjacent to the new video signal tracks is erased. The stored audio signal, which has been delayed for a predetermined interval, is then re-recorded to replace the erased audio track portion, in precise synchronism with the newly recorded video signal. The above operation is achieved during a single continuous pass of the magnetic tape.

The delay provided by the storage delay unit is equivalent to the delay experienced by the tape being edited, as it passes from the audio bypass head to the audio record head of the editing system. The storage unit, which may be a magnetic tape recorder by way of example, may provide such delay by a similar spacing of the record and playback heads as the spacing between the audio bypass head and the audio recording head of the editing system, in addition to using a similar tape speed as the editing system. Other forms of providing the necessary delay may include magnetic core systems, known delay lines, or phonograph records.

Figure 2:
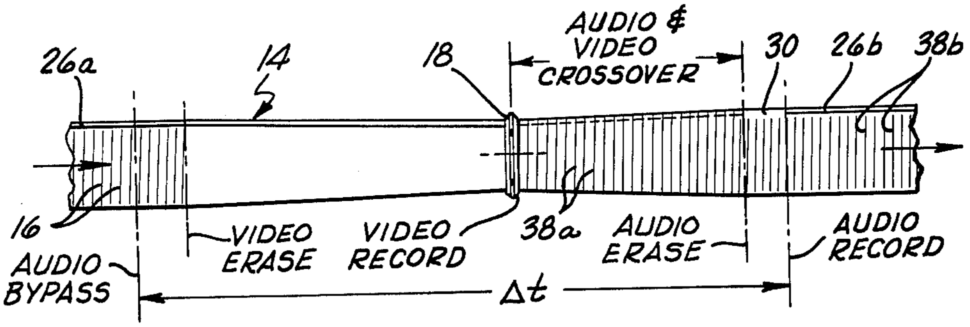

The invention will be described in greater detail with reference to the drawing in which:

FIGURE 1 is a simplified schematic and block diagram of an editing system, in accordance with this invention; and FIGURE 2 is a representation of a portion of a magnetic tape that is being edited in accordance with this invention.

With reference to FIGURES 1 and 2, an editing system comprises a television magnetic tape recorder and reproducer that includes a supply reel 10 and a takeup reel 12 between which a magnetic tape 14 is driven. For convenience of explanation, only those parts that are considered essential for describing the invention are illustrated in simplified form. Detailed descriptions of such a television recording apparatus may be found in the aforementioned U.S. Patents 2,866,012, 2,921,990 and 2,942,061, among others, that are assigned to the same assignee.

During the recording mode when making an original recording, transverse tracks 16 are registered on the magnetic tape 14 by a rotary head drum 18 that carries a plurality of equally spaced transducers 20 at its periphery. The magnetic transducers 20 sweep across the longitudinally moving tape 14, in close contact with the tape which is held in an arcuate form by a concave tape guide (not shown) that is fixed in juxtaposition relative to the rotating head drum 18. Prior to recording the video tracks, a video erase head 22 clears the tape 14 of any undesirable signals that may be found on the tape so that the recorded video signals will not be degraded.

Similarly, an audio record head 24 serves to record a longitudinal audio signal track **26*a* along one edge of the magnetic tape 14 in synchronism with the video signals recorded on the transverse tracks 16. An audio erase head 28 is located just prior to the audio record head 24 to erase part of the video tracks 16 which is redundant; thereby providing a clean tape portion 30 along one longitudinal edge of the tape 14 for the audio signals that are to be recorded. Since the positioning of the audio erase head 28 and the audio record head 24** is generally standard on television tape recorders, tapes that are edited in accordance with this invention may be interchangeable between different tape apparatus.

In accordance with this invention, the editing system includes an audio bypass head 32 that is located before the video erase head 22 in the direction of motion of the tape 14. When it is desired to record a new video signal in lieu of a prerecorded video portion, and yet retain the audio information along the same segment of tape by electronic editing in accordance with this invention, the prerecorded tape 14 is transported through the magnetic tape apparatus. As is explained in U.S. Patent 3,084,215, the editing period is initiated by the use of a start signal and a subsequent edit pulse to provide accurate synchronization between the new information being recorded and the previously recorded information. Upon the occurrence of the first edit pulse after the start of the edit cycle, the audio bypass head 32 is energized and senses the recorded audio signal on the longitudinal track **26*a*, feeding such sensed signal through a playback amplifier 34 to a storage delay unit 36**.

The storage delay unit 36 may be another television recorder that has an audio record head and an audio playback head spaced the same respective distance as found between the audio bypass head 32 and the audio record head 24 of the television recording apparatus being used for the editing process. Thus, the signal that is picked up by the audio bypass head 30 is passed to the record head in the delay unit 36 that records the audio signal on a magnetic tape for storage for a predetermined delay period. The storage tape is transported at the same speed as the tape 14 in the editing television recorder. The delay provided may be about 1.4 seconds when using a tape speed of 15 inches per second, with the bypass head 32 and record head 24 spaced about 21 inches apart.

While the storage tape is progressing in the delay unit 36 from the record head to the playback head, the portion of the tape 14 that is being edited moves from the area of the audio bypass head 32 to the video erase head 22. The electronic editing system provides a fixed delay that determines when the erasure of the undesirable video signal transverse tracks 16 by the video erase head 22 is to begin, and provides a second delay that is controlled by a predetermined number of edit pulses to determine when a new video signal 38 is to be recorded by the video record head 18. The video record head 18 registers new transverse tracks **38*a* on the erased segment of tape, such tracks 38*a* traversing the longitudinal audio track 26 which is still present on the tape 14**.

At a fixed time after the initiation of the new video recording by the record head 18, which time is determined by the delay provided by the unit 36, the stored audio signal is reproduced by the storage unit 36, and channeled to an electronic network 40, that includes a record amplifier and bias and erase oscillators. The erase oscillator provides a signal that energizes the audio erase head 28 to cause the erasure of the longitudinal audio track **26*a*, which has been intersected by the newly recorded transverse tracks 38*a*. Simultaneously, the audio signal which has been stored in the delay unit 36 is passed through the record amplifier and bias oscillator, and is re-recorded by means of the record head 24. As a result of the fixed delay provided by the storage unit 36, the re-recorded audio track 26*b* is in synchronism with the newly recorded transverse tracks 38*b***. In this manner, a new video signal may be substituted for previously recorded video information, without having a degraded audio signal track.

There has been described herein an improved electronic editing system for a record having a plurality of different signals, wherein it is desired to preserve one signal that has been recorded, while substituting a new signal for another previously recorded signal. However, it is apparent that the invention is not necessarily limited to the particular embodiment set forth above. For example, the storage delay unit may be any electromechanical or electronic delay that is capable of storing the sensed audio signal for a predetermined interval. Other modifications may be made to the described system within the scope of this invention.

What is claimed is:

1. An electronic editing system for editing a recording medium having a first signal recorded on transverse tracks and a second signal recorded on a longitudinal track, comprising:

means for deriving the second signal recorded on the longitudinal track;
means for storing the derived signal for a predetermined period;
means for selectively erasing a number of the transverse signal tracks;
means for recording a new signal in lieu of the erased transverse signal tracks;
means for erasing the longitudinal track in that portion of the tape containing the new transversely recorded signal; and
means for recording the stored signal in such tape portion and in synchronism with the newly recorded signal.

2. An electronic editing system wherein a magnetic tape having recorded transverse video tracks and a longitudinal audio signal track is being edited comprising:

means for deriving the recorded audio signal from the magnetic tape;
means for storing the derived audio signal for a predetermined interval;
means for erasing a number of recorded video tracks in a selected segment of the tape;
means for recording a new video signal over the erased tape segment;
means for erasing the audio track in that portion of the tape containing the new transversely recorded video signal; and
means for recording the stored audio signal in such tape portion and in synchronism with the newly recorded video signal.

3. An electronic editing system for editing a magnetic tape having an audio signal registered on a longitudinal track and a video signal registered on a number of spaced transverse tracks comprising:

means for transporting the tape along a defined path at a substantially constant speed;
an audio bypass head, a video erase head, a video record head, and an audio erase head, and an audio record head spaced along such path in that order;
means for storing the audio signal sensed by the bypass head for a fixed interval;
a record amplifier and erase bias oscillators coupled between said audio signal storing means and said audio erase and record heads; and
means for re-recording the stored signal, including such record head, upon the termination of such fixed interval.

4. An electronic editing system wherein a magnetic tape having recorded transverse video tracks and a longitudinal audio signal track is being edited comprising:

means for deriving the recorded audio signal from the magnetic tape;

means for storing the derived audio signal for a predetermined interval;

a playback amplifier coupled between said signal deriving means and said storing means;

means for selectively erasing a portion of the recorded video tracks;

means for recording a new video signal over the erased portion;

means for erasing the audio signal track in that portion of the tape containing the newly recorded video signal;

means for recording the stored audio signal in such tape portion and in synchronism with the newly recorded video signal; and a record amplifier, and erase and bias oscillators coupled between said storing means and said audio signal erasing and stored signal recording means respectively.

5. An electronic editing system for editing a magnetic tape having an audio signal registered on a longitudinal track and a video signal registered on a number of spaced transverse tracks comprising:

means for transporting the tape along a defined path;

an audio bypass head, a video erase head, a video record head, an audio erase head, and an audio record head spaced along such path in that order;

means for storing the audio signal sensed by the bypass head for a fixed interval; and means for re-recording the stored signal, including such record head, upon termination of such fixed interval.

6. A method for electronically editing a magnetic tape having an audio signal recorded on a longitudinal track and a video signal recorded on transverse tracks comprising the steps of:

obtaining and storing a selected portion of the audio signal;

erasing a number of transverse tracks of the video signal that are correlated with the stored audio signal;

recording a new video signal on the erased portion of the tape;

erasing the audio signal track in that portion of the tape containing the new video signal; and recording the stored audio signal in lieu of the erased audio signal and in synchronism with the new video signal, all the above steps being achieved during a sing'e pass of the tape.

No references cited.

DAVID G. REDINBAUGH, *Primary Examiner.*

H. W. BRITTON, *Assistant Examiner.*